US009794833B1

(12) United States Patent
Lei et al.

(10) Patent No.: US 9,794,833 B1

(45) Date of Patent: Oct. 17, 2017

(54) SYSTEM AND METHOD FOR DYNAMIC FEATURE SELECTION BASED ON LATENCY DISCOVERY

(71) Applicants: AT&T INTELLECTUAL PROPERTY I, LP, Atlanta, GA (US); AT&T MOBILITY II LLC, Atlanta, GA (US)

(72) Inventors: Hongyan Lei, Plano, TX (US); Ye Chen, Milton, GA (US); Zhi Cui, Sugar Hill, GA (US); Cheng P Liu, Johns Creek, GA (US); Yonghui Tong, Alpharetta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/170,784

(22) Filed: Jun. 1, 2016

(51) Int. Cl.
*H04W 36/00* (2009.01)

(52) U.S. Cl.
CPC ... *H04W 36/0022* (2013.01); *H04W 36/0055* (2013.01); *H04W 36/0088* (2013.01)

(58) Field of Classification Search
CPC .... H04L 43/08; H04L 43/0852; H04W 16/14; H04W 24/02; H04W 28/0284;
(Continued)

(56) References Cited

U.S. PATENT DOCUMENTS 8,526,391 B2 9/2013 Issakov et al.
8,897,830 B2 11/2014 Gao
(Continued)

FOREIGN PATENT DOCUMENTS

EP 2107696 A1 10/2009
EP 2946585 7/2014
(Continued)

OTHER PUBLICATIONS

"SelfOptimizing Networks: The Benefits of SON in LTE", 4G Americas, 4gamericas.org, Jul. 2011., 2011.
(Continued)

*Primary Examiner* — Ronald Eisner

(74) *Attorney, Agent, or Firm* — Guntin & Gust, PLC; Douglas Schnabel

(57) ABSTRACT

Aspects of the subject disclosure include, for example, identifying a primary serving cell and a secondary serving cell, wherein the primary serving cell facilitates one of attachment, re-attachment or mobility, or any combination thereof, of a mobile device in association with coordination of a wireless service between the primary serving cell, the secondary serving cell and the mobile device. A latency value associated with a message exchange is determined between the primary and secondary serving cells via a messaging interface, and compared to latency requirements, which correspond to a group of mobile service features. A mobile service feature of the group is associated with the wireless service based on the comparison. The wireless service includes a coordinated exchange of wireless signals between the primary serving cell and the mobile device and between the secondary serving cell and the mobile device based on the mobile service feature. Other embodiments are disclosed.

20 Claims, 8 Drawing Sheets

(58) Field of Classification Search
CPC . H04W 28/16; H04W 36/22; H04W 72/0413; H04W 72/06; H04W 72/1226; H04W 72/1278; H04W 84/045; H04W 8/22
USPC ............. 455/422.1, 445, 450–455, 464, 509; 370/328–337, 339, 341–348, 431–463
See application file for complete search history.

(56) References Cited

U.S. PATENT DOCUMENTS

| | | | | |
|---|---|---|---|---|
| 9,084,155 | B2 | 7/2015 | Rubin et al. | |
| 9,107,092 | B2 | 8/2015 | Agarwal et al. | |
| 9,107,094 | B2 | 8/2015 | Rubin et al. | |
| 9,191,269 | B2 | 11/2015 | Turlington et al. | |
| 9,288,734 | B2 | 3/2016 | Jha et al. | |
| 2014/0219162 | A1 | 8/2014 | Eyuboglu et al. | |
| 2015/0141021 | A1 | 5/2015 | Kapoulas et al. | |
| 2015/0189551 | A1 | 7/2015 | Ozturk et al. | |
| 2015/0263921 | A1 | 9/2015 | Lee et al. | |
| 2015/0312776 | A1 | 10/2015 | Cui | |
| 2015/0358959 | A1* | 12/2015 | Meshkati et al. | H04W 72/0413 370/329 |
| 2016/0081082 | A1 | 3/2016 | Cao et al. | |

FOREIGN PATENT DOCUMENTS

| | | | |
|---|---|---|---|
| KR | 1020150017642 | | 2/2015 |
| WO | 2014209185 | A1 | 12/2014 |
| WO | 2015070903 | A1 | 5/2015 |
| WO | 2015175725 | | 11/2015 |

OTHER PUBLICATIONS

Meyland, Arnaud, “LTE Radio Layer 2, RRC and Radio Access Network Architecture”, 3GPP™, 3gpp.org, Rev090004, (2010), 2010.

Mishra, Sumita et al., “Load Balancing Optimization in LTE/LTEA Cellular Networks: A Review”, arXiv preprint arXiv:1412.7273 (2014), 2014.

Okubo, Naoto et al., “Overview of LTE radio interface and radio network architecture for high speed, high capacity and low latency”, NTT DOCOMO Technical Journal 13.1 (2011): 1019, 2011.

* cited by examiner

100

200

260

300

500

SHO
511
SHS
510
530
562
VHO 1
VHO 2
VHO 3
VHO 4
VHO 5
VHO 6
512
ISP
Network
532
EPC
570
514
VHS
518
ACCESS NETWORK
529
515
564
517a
518
X2
517b
519
Satellite dish
receiver 531
508
566
STB 506
G 504
Ctrl 507
STB 506
ISP Ntwk 532
Cable TV
533
502
508
516
Remote
Services PORTAL
602
http://www.myportal.com/
DVR
IMS Services
VoD Catalog
Internet Services
EPG
Cell phone Services
Personal Catalog
562-566
600

Media Processor
Communication Devices

704
Keypad 708
Display 710
Audio System 712
Image sensor 713
Location Receiver 716
Transceiver 702
Controller 706
Orientation Sensor 720
Motion Sensor 718
562-566
Power Supply 714
700

SYSTEM AND METHOD FOR DYNAMIC FEATURE SELECTION BASED ON LATENCY DISCOVERY

FIELD OF THE DISCLOSURE

The subject disclosure relates to a system and method for dynamic feature selection based on latency discovery.

BACKGROUND

In order to support continued growth of mobile traffic, the 3rd Generation Partnership Protocol (3GPP) has introduced advanced features to its Long Term Evolution (LTE) architecture, generally referred to as LTE-Advanced (LTE-A). In particular, implementation of the advanced features is expected to enhance network throughput and/or mobility robustness. Such advanced features can be provided in association with Heterogeneous Network (HetNet) to improve coverage, capacity and/or performance of a mobile network.

BRIEF DESCRIPTION OF THE DRAWINGS

Reference will now be made to the accompanying drawings, which are not necessarily drawn to scale, and wherein.

DETAILED DESCRIPTION

Figure 1:
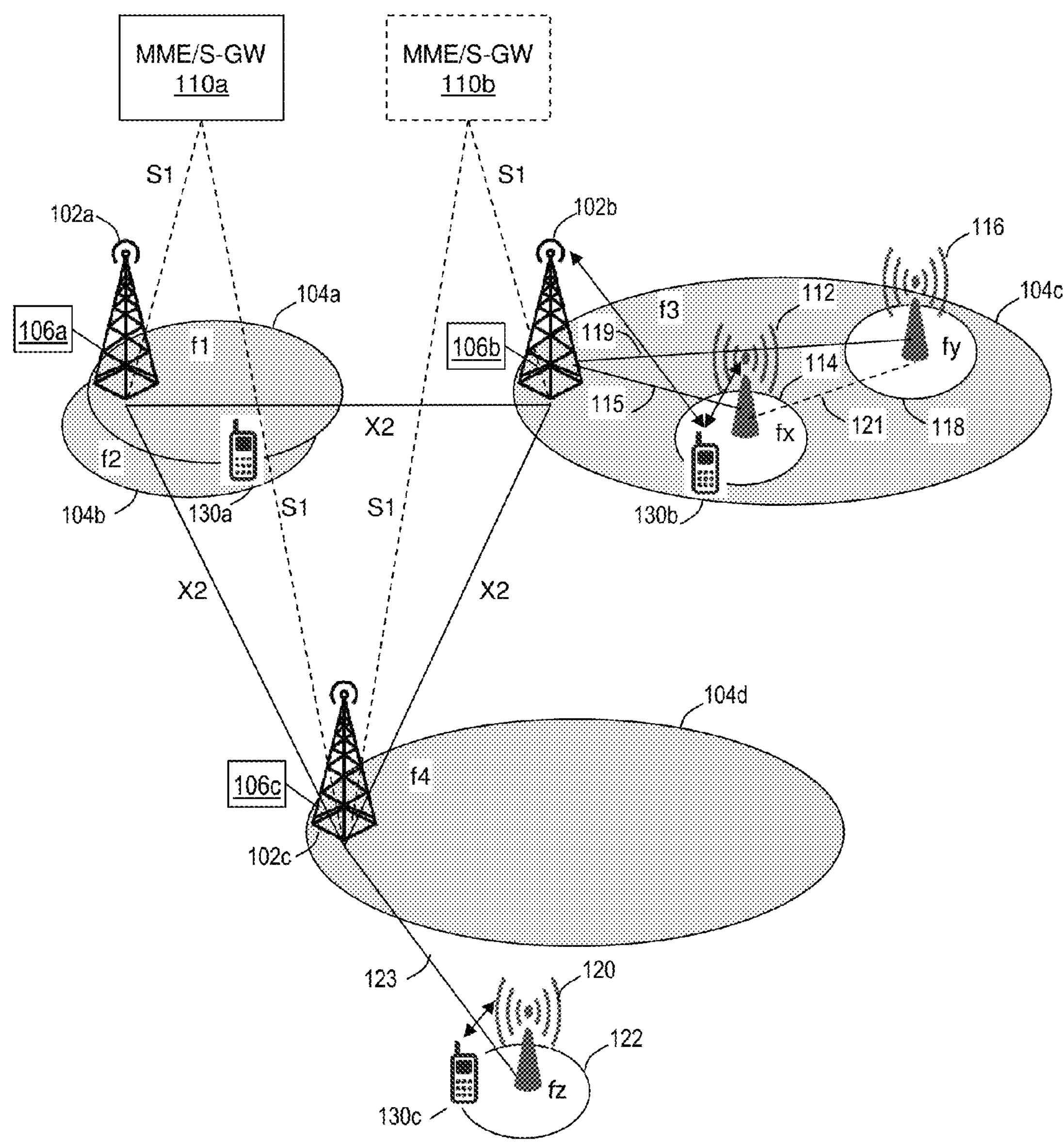
FIG. 1 depicts an illustrative embodiment of a portion of a mobile cellular network that implements feature selection based on latency measurements.

The subject disclosure describes, among other things, illustrative embodiments for determining a latency of an interface between cells of a mobile cellular network and selecting features of a group of mobile features that provide a common wireless service to a mobile device that is coordinated among multiple cells, e.g., a primary serving cell and a secondary serving cell. In a 3GPP LTE architecture, the interface between cells includes an "X2" interface, and the group of mobile features includes, without limitation, coordinated multipoint (CoMP), carrier aggregation (CA) and dual connectivity (DC). Other feature can include non-real time features, such as an exchange of load information. A latency of the X2 interface can be determined by a message exchanged between the primary and secondary serving eNBs, e.g., by an extended X2 Access Protocol (AP) according to the techniques disclosed herein. A feature set can be determined, e.g., from among the CoMP, CA, DC and other features, based on the latency. Other embodiments are described in the subject disclosure.

One or more aspects of the subject disclosure include a system, including a processing system including a processor and a memory that stores executable instructions. The instructions, when executed by the processing system, facilitate performance of operations, including identifying a primary serving cell and a secondary serving cell of a mobile cellular network, wherein the primary serving cell facilitates one of attachment of a mobile device to the mobile cellular network, re-attachment of the mobile device to the mobile cellular network, mobility of the mobile device between the primary serving cell and another cell of the mobile cellular network, or any combination thereof in association with coordination of a wireless service between the primary serving cell, the secondary serving cell and the mobile device. The operations further include determining a latency value associated with a message exchange between the primary serving cell and the secondary serving cell via a messaging interface between the primary serving cell and the secondary serving cell. The latency value is compared to latency requirements corresponding to a group of mobile service features. A mobile service feature of the group of mobile service features is associated with the wireless service based on the comparison. The wireless service includes a coordinated exchange of wireless signals between the primary serving cell and the mobile device and between the secondary serving cell and the mobile device based on the mobile service feature of the group of mobile service features.

One or more aspects of the subject disclosure include a process that includes determining, by a system comprising a processing system including a processor, a first cell and a second cell of a mobile cellular network, wherein the first cell facilitates coordination of a wireless service to a mobile device. The process further includes determining, by the processing system, a latency value associated with a message exchange between the first cell and the second cell via a messaging interface between the first cell and the second cell. The latency value is compared, by the processing system, to a group of latency requirements corresponding to a group of mobile features to obtain a comparison. A mobile feature of the group of mobile features is associated, by the processing system, with the wireless service based on the comparison. The wireless service includes a coordinated exchange of wireless signals between the first cell and the mobile device and between the second cell and the mobile device based on the mobile feature of the plurality of mobile features.

One or more aspects of the subject disclosure include a machine-readable storage medium, including executable instructions that, when executed by a processing system including a processor, facilitate performance of operations. The operations include determining a first cell and a second cell of a mobile cellular network, wherein the first cell and the second cell provide a joint wireless service to a mobile device. The operations further include determining a latency value associated with a message exchange between the first cell and the second cell via a messaging interface between the first cell and the second cell. The latency value is compared to a group of latency requirements that correspond to a group of mobile features. A set of mobile features of the group of mobile features is selected based on the comparison, to obtain a selected set mobile features, wherein a mobile feature of the set of mobile features is applied to the wireless service to obtain a joint exchange of wireless signals between the first cell and the mobile device and between the second cell and the mobile device based on the mobile feature of the set of mobile features.

FIG. 1 depicts an illustrative embodiment of a portion of a mobile cellular network 100 that implements feature selection based on latency measurements. The network is based on 3GPP LTE technology and includes a first radio base station, or eNB 102*a*, that services a first macro-cell 104*a* that operates according to a first frequency assignment, f1. It is understood that a single radio station, such as the first eNB 102*a*, can service more than one cell. The cells can be arranged in a non-overlapping fashion, e.g., servicing different sectors of a serviced region. Alternatively or in addition, the cells can be overlapping, e.g., as in servicing different frequency channels and/or frequency bands of an overlapping, e.g., the same, region. In the illustrative example, the first eNB 102*a* also services a second, overlapping macro-cell 104*b*, operating according to a second frequency assignment, f2.

An example UE 130*a*, operating within a coverage region of the first macro-cell 104*a*, and the overlapping second macro-cell 104*b*, can be serviced by the first macro-cell 104*a*, the second macro-cell 104*b*, or a combination of both the first and second macro-cells 104*a*, 104*b*. Such combined services can include wireless services coordinated among multiple cells and/or wireless base stations, such as the coordinated services disclosed herein, e.g., CoMP, CA, and/or DC. Wireless services can include one or more of Voice over IP (VoIP), Short Message Service (SMS), Multimedia Messaging Service (MMS), streaming audio, streaming video, streaming multimedia, file transfer, web browsing sessions, and the like. Although an interface is not illustrated in FIG. 1, it is understood that an interface can be provided between the radio resource servicing the first macro-cell 104*a* and the second macro-cell 104*b*. The interface can operate according to a standard interface protocol, such as an X2 interface, or to any other interface, including a proprietary interface.

Any of the macro-cells 104*a*, 104*b* can be arranged to expand capacity of wireless services in a given geographic region. For example, a macro-network can maintain a homogenous network by deploying more macro eNBs, by adding more sectors per eNB, and/or by adding more radios servicing more radio frequency channels and/or bands per sector. It is also understood that frequency assignment can include a frequency band, a frequency channel within the frequency band, a grouping of such frequency bands and/or channels, e.g., according to an up-link and down-link channel assignments.

Alternatively or in addition, it is understood that wireless coverage of the network 100 can be enhanced with a deployment of one or more, so-called, small cells. A combination of macro-cells and small cells within the same network is generally referred to as a heterogeneous network. Scenarios and requirements for small cell enhancements, are disclosed in, for example, "3rd Generation Partnership Project; Technical Specification Group Radio Access Network; Scenarios and requirements for small cell enhancements for E-UTRA and E-UTRAN" (Release 13), 3GPP TR 36.932 V13.0.0, incorporated herein by reference in its entirety. Small cells generally refer to low power nodes having a transmit power that is lower than a macro node and base station (BS) classes, such as Pico and Femto eNB. The small cells can be used in hotspot deployments in indoor and outdoor scenarios to cope with increasing mobile traffic demands.

In the illustrative example, a second radio base station, or eNB 102*b*, services a third macro-cell 104*c*, according to a third frequency assignment, f3. A first small cell 114 includes a radio base station, eNB or wireless access point 112. The small cell services a hotspot within the coverage of the third macro-cell 104*c*, according to a frequency assignment, fx. An example UE 130*b*, operating within a coverage region of the first small cell 114, can be in communication with the small cell access point 112, the second eNB 102*b*, or both. In at least some embodiments, a first interface 115 is provided between the first small cell access point 112 and the second eNB 102*b*.

Likewise, a second small cell 118 includes a radio base station, or wireless access point 116. Once again, the second small cell 118 services a hotspot within the coverage of the third macro-cell 104*c*, according to a frequency assignment, fy. Similarly, a second interface 119 is provided between the second small cell access point 116 and the second eNB 102*b*. It is understood that one or more of the first interface 115, the second interface 119, or the third interface 121 can operate according to an X2 protocol, along a back-haul and/or front-haul network, according to another protocol, e.g., including a proprietary protocol, or any combination thereof.

In the illustrative example, a third radio base station, or eNB 102*c*, services a fourth macro-cell 104*d*, according to a fourth frequency assignment, f4. A third small cell 122 includes a radio base station, or wireless access point 120. The small cell 122 services a region at least partially outside of the coverage area of the fourth macro-cell 104*d*, according to a frequency assignment, fy. An example UE 130*c*, operating within a coverage region of the third small cell 122, can be in communication with the small cell access point 1120, but not necessarily in communication with the third eNB 102*c*. In at least some embodiments, an interface 123 is provided between the third small cell access point 120 and the third eNB 102*c*.

Each of the eNBs 102*a*, 102*b*, 102*c* is in communication with one or more of the others by way of a respective X2 interface. The first and third eNBs 102*a*, 102*c* are in further communication with a first EPC, including a first MME/S-GW 110*a*. This connectivity includes a control plane interface S1-C and a user plane interface S1-U, generally S1, e.g., to coordinate and/or otherwise support delivery of mobile services to the UEs 130*a*, 130*b*, 130*c*. Likewise, the second and third eNBs 102*b*, 102*c* are in further communication with a first EPC, including a second MME/S-GW 110*b*.

In addition to the wireless coverage provided to mobile equipment by macro-cells and/or small cells, the cells are also connected to other network elements by way of intermediate links. Such intermediate links, e.g., between a core network or a backbone network and small subnetworks at the edge, including the eNBs 106 and/or the small cells are commonly referred to as a "backhaul" portion of the network. For example, the base stations, eNBs and/or wireless access points of the cells can be connected to a core network, such as an Evolved Packet Core (EPC) of the example 3GPP LTE network by such a backhaul network. In the illustrative embodiment, only a portion of such an EPC is shown, as an MME/S-GW 110*a*, 110*b* (generally 110). The MME/SGW 110 relates to an MME (Mobility Management Entity) network entity and an S-GW (Serving Gateway) network entity. It is understood that any practical EPC includes other network elements, such as the P-GW (Packet data network Gateway) and the HSS (Home Subscriber Server).

A first cell of a wireless mobile network, sometimes referred to as a primary or coordinating serving cell, can include a cell that coordinates, performs or otherwise facilitates one or more of an initial connection establishment procedure with a UE, a connection re-establishment procedure with the UE, and/or a handover procedure for the UE. In this manner, the primary serving cell can be thought of as a cell on which the UE is "camped." It is understood that the primary serving cell can participate in one or more coordinated wireless services with the UE, including multi-cell radio access technologies, such as CoMP, Carrier Aggregation and Dual Carrier. A second cell of the wireless network, sometimes referred to as a secondary or non-coordinating serving cell can include any other cell that participates with the primary serving cell to support coordinated wireless services with the UE, including multi-cell radio access technologies. It is understood that in at least some embodiments, the secondary serving cell may not participate in, coordinate or otherwise facilitate the attachment, re-attachment and/or mobility of the mobile device in relation to a multi-cell radio access technology that include the primary serving cell and the secondary serving cell.

Backhaul technologies include, without limitation, LMDS (Local Multipoint Distribution Service), WiFi, WiMAX, DSL (Digital subscriber line), including ADSL (Asynchronous DSL) and SHDSL (Symmetrical high-speed DSL), PDH (Plesiochronous Digital Hierarchy), SDH (Synchronous Digital Hierarchy), SONET (Synchronous Optical Network) and Ethernet. A backhaul portion of a network can be referred to as an "ideal" backhaul if it provides a very high throughput and very low latency, such as dedicated point-to-point connection using optical fiber, free-space optical, and the like. A backhaul portion of a network can also be referred to as a "non-ideal" backhaul if it typical backhaul widely used in the market such as xDSL, microwave radio relay transmission, terrestrial and/or satellite, and other backhauls that include relaying. Backhauls can be point-to-point or point-to-multipoint.

Each of the eNBs 102*a*, 102*b*, 102*c* is in communication with a respective coordination controller 106*a*, 106*b*, 106*c*, generally 106. The coordination controller 106 facilitates delivery of wireless service features that include coordinated among several nodes, e.g., according to CoMP, CA and/or DC. Although the coordination controllers 106 are shown in combination with the macro-cell eNBs 102, it is understood that in at least some embodiments, a coordination controller 106 is in communication with one or more of the small cell wireless access points 112, 116, 120.

Coordinated, or multi-node features include, without limitation, CoMP, CA and DC. In some embodiments, each eNB 102 is collocated with a respective coordination controller 106. The coordination controller 106 can include a separate hardware module in communication with the eNB 102. Alternatively or in addition, the coordination controller 106 can be combined with the eNB 102, e.g., as a combined hardware module and/or software module. It is also envisioned that one or more of the coordination controllers 106 can be physically separated from the eNB 102, e.g., resident at a data center, such as the EPC and/or at anywhere accessible by the Internet, e.g., at third-party operator location. It is also understood that a coordination controller 106 can serve more than one of the radio base stations 102.

With Coordinated multipoint transmission and/or reception (CoMP) a number of transmission/reception points, e.g., eNBs and/or small cell radio base stations or wireless access points, can be coordinated to provide service to a UE. For example, data can be transmitted at the same time in the same PRB (Physical Resource Block) from more than one transmission point to one UE, or data can be received from one transmission point in one sub-frame and from another transmission point in the next sub-frame. When CoMP is used in a heterogeneous network a number of macro-cells and small cells can be involved in data transmission to and from one UE.

CoMP requires that the involved cells coordinate their radio frequency signal in a highly accurate way, e.g., according to phase synchronization and high-capacity connectivity with low latency. Coordinating features, such as CoMP, benefit from time synchronization and in inter-cell communication. In an LTE scenario, the inter-cell communications can leverage respective interfaces of the LTE architecture, such as the X2 interface between eNBs.

Another coordinated wireless service feature is referred to as Carrier Aggregation (CA). When CA is used a number of radio frequency carriers, referred to as Component Carriers (CC), are aggregated and a CA-capable UE can be allocated resources on one or more CCs. Cross-carrier scheduling is an important feature in heterogeneous networks. Using cross-carrier scheduling it is possible to map PDCCH (Physical Downlink Control Channels) on different CCs in the large and small cells.

With spectrum allocated for 4G networks, operators often find they have a variety of small bands that they have to piece together to provide the required overall bandwidth needed for 4G LTE. Making these bands work seamlessly is a key element of the LTE heterogeneous network operation.

Yet another coordinated wireless service feature is referred to as Dual Carrier (DC). According to DC operations, a UE can receive and/or transmit data from and/or to multiple eNBs simultaneously, e.g., carriers can be bundled by the network. One of the eNBs can be referred to as a Master eNB (MeNB), while one or more other eNBs can be referred to as Secondary eNBs (SeNB). Backhaul between low power nodes providing small cells and macro nodes may be ideal or non-ideal. Intra-eNB CA and CoMP features assume ideal backhaul in which centralized scheduling can be implemented for efficient radio resource utilization. DC extends CA & CoMP to inter-eNB with non-ideal backhaul.

With present mobile backhaul networks, the X2 interface is typically connected through a service edge router that links each radio base stations with its controller and/or S-GW. Control traffic must be exchanged with stringent delay requirements of less than about 1 millisecond. Each radio needs to be supplied with precise time/phase information with accuracy in the order of sub-millisecond, e.g., microsecond. Location-based services demand even lower tolerance of sub-microsecond, as phase differences among several radio signals can be used to calculate the location of user equipment. Such stringent requirements can drive a change in the backhaul architecture to switch and/or rout the X2 interface closer to the radio base stations, sometime referred to as front-haul networks. Without limitation, such front-haul networks can include fiber to the cell site, renting dark fiber, sharing fiber and/or the transmission system with another operator or lease bandwidth from a wholesale bandwidth provider, and the like. Without limitation, interconnections between radio base stations, including macro-cell and/or small cell can be in communication with one or more other macro-cells and/or small cells by way of back-haul networks, front-haul networks, or any combination thereof.

Figure 2A:
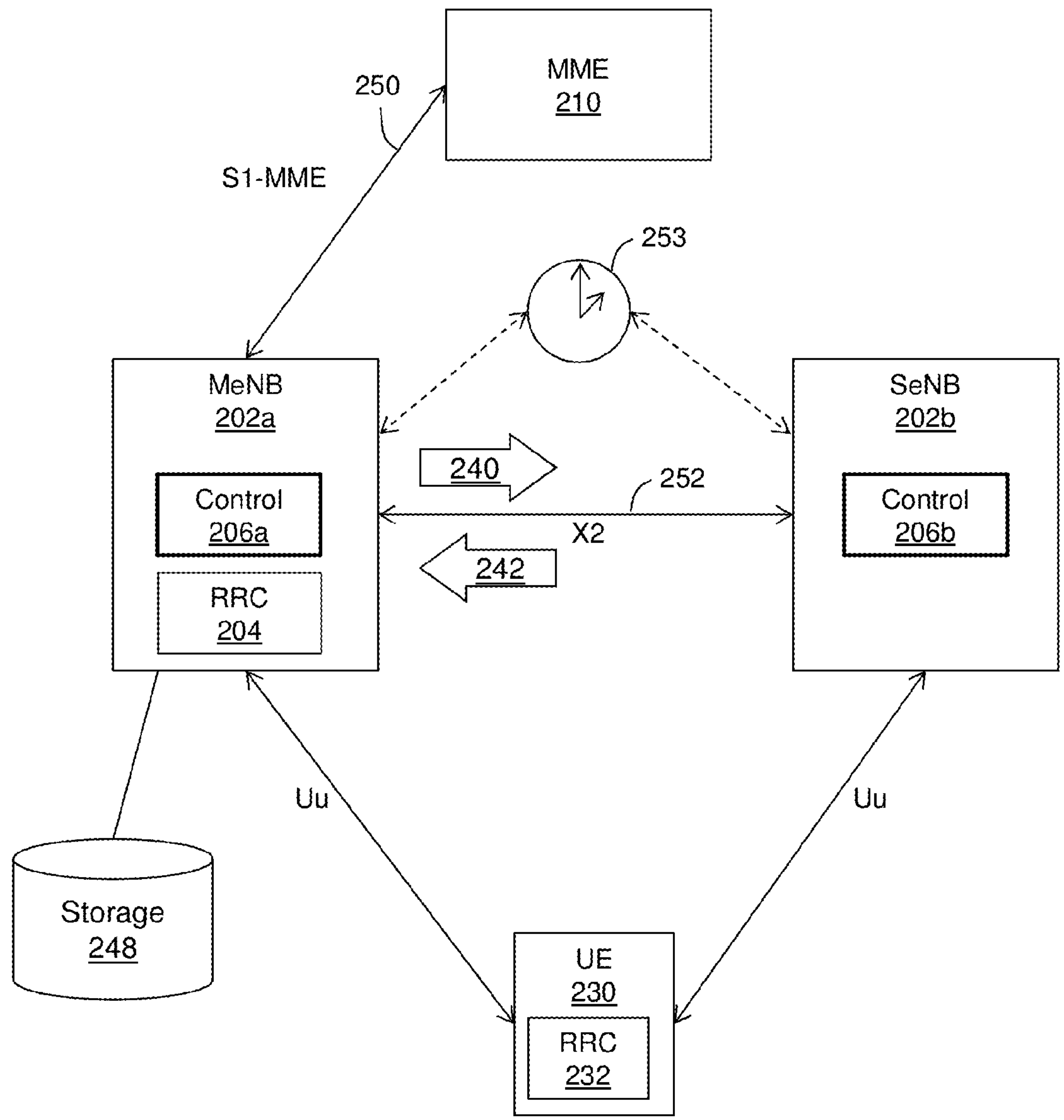
FIG. 2A depicts an illustrative embodiment of a schematic diagram of a portion of a mobile cellular system that implements feature selection based on latency measurements.

FIG. 2 depicts an illustrative embodiment of a schematic diagram of a portion of another mobile cellular system 200 that implements configuration feature selection based on latency measurements. The system includes a Master eNB (MeNB) 202 having a radio resource control (RRC) 204 and a coordination controller 206*a*. The RRC 204 facilitates establishment and coordination of wireless connectivity with a mobile station, or UE 230. The system 200 includes at least one secondary or supporting eNB (SeNB) 202*b*. The SeNB 202*b* includes radio resources to support wireless communications with the UE 230. Although the SeNB 202*b* may include an RRC (not shown), it is not necessary for at least some of the coordinating features.

In the illustrative example, the UE 230 also includes a radio to support wireless communications with the MeNB 202*a* and/or the SeNB 202*b*. The UE 230 includes an RRC 232 to facilitate wireless connectivity with at least the MeNB 202*a*. The RRC 204, 232, provides a Radio Resource Control protocol used in UMTS and LTE on the Air interface. For example, the RRC 204, 232 handles control plane signaling between the UE 230 and the Radio Access Network (UTRAN or E-UTRAN) as well as for the radio interface between a Relay Node and the E-UTRAN.

The MeNB 202*a* is in further communication with an MME 210 of an EPC 211 by way of an S1-MME interface. The MeNB 202*a* and the SeNB 202*b* are in communication with each other by way of an X2 interface. The X2 interface can be accommodated by one or more of a back-haul network or a front-haul network 252. One or more of the MeNB 202*a* and the SeNB 202*b* can communicate with the UE 230 via respective Uu protocol interfaces over the air network.

In some embodiments, the system 200 is operated in a synchronous mode. The system 200 can include a timing source 253, such as a precision system clock, and/or a remote timing source, such as a system time source, a satellite time, e.g., GPS time, or some other reliable timing reference, e.g., the National Institute of Standards and Technology (NIST), WWV coordinated time, and the like. More than one different time sources can be provided in primary and fallback configuration, e.g., using GPS as a primary synchronization reference and using the NIST WWV as a fall back. The example system also includes a storage element 248. The storage element 248 can be physical storage available at one or more of the MeNB 202*a* and the SeNB 202*b*. Alternatively or in addition, the storage element 248 can include networked storage, e.g., in the form of cloud storage, or a database.

According to the illustrative example, the MeNB 202*a* and the SeNB 202*b* can provided one or more coordinated services to the UE 230. The coordinated services can include, without limitation, CoMP, CA and DC features. In some embodiments, a set of possible features is identified for the network 200. The feature set can be stored in a configuration file, e.g., at the eNB 202 and/or in the storage element 248. Having established that at least some of the features of the feature set depend upon performance of an inter-radio terminal interface, available features may be restricted to a subset of all possible features based on the inter-radio terminal interface.

In some embodiments, a performance metric of the X2 interface is determined. The performance metric can include one or more of a time reference, a message transit time, a message delay time, a latency, and so forth. The performance metric can include a one way metric, e.g., from the MeNB 202*a* to the SeNB 202*b*, from the SeNB 202*b* to the MeNB 202*a* and/or a round trip time between the MeNB 202*a* and the SeNB 202*b*. In some embodiments, the performance parameter of the X2 interface is stored in association with a group of base stations to which the performance parameter applies, e.g., the MeNB 202*a* and the SeNB 202*b*.

The performance metric of the X2 interface can be determined by various techniques, including a message exchange. For example, an "X2 Latency Discovery" message(s) can be added to the 3GPP LTE specification. With the new message(s), two cells can automatically communicate and detect the actual X2 latency, which allows the eNB to dynamically select the optimal features to maximize the performance and/or efficiency of the network.

In some embodiments, one or more new X2 messages can be defined that are not currently part of the LTE standards. The new X2 message(s) facilitate detection of a latency associated with a message exchange of an X2 interface between two cells. It is understood that the new X2 message(s) would be added to a future version of the standards, once adopted.

For example, an X2 latency discovery procedure, including an exchange of the new X2 message(s) can be initiated at eNB power-up, periodically, and/or responsive to an event (such as new neighbor addition). It is understood that latency may fluctuate for any of various reasons. Accordingly, an eNB can conduct latency testing using an exchange of the new X2 message(s) several times, to allow for determination of a statistical convergence, a range, etc. An eNB can be configured with intelligence, e.g., within eNB software, to decide when and how often to implement such latency testing. For example, a frequency for determining X2 latency can be based on whether some of the LTE-A features will be needed, e.g., in an on-demand fashion, to avoid any unnecessary extra X2 signaling.

Figure 2B:
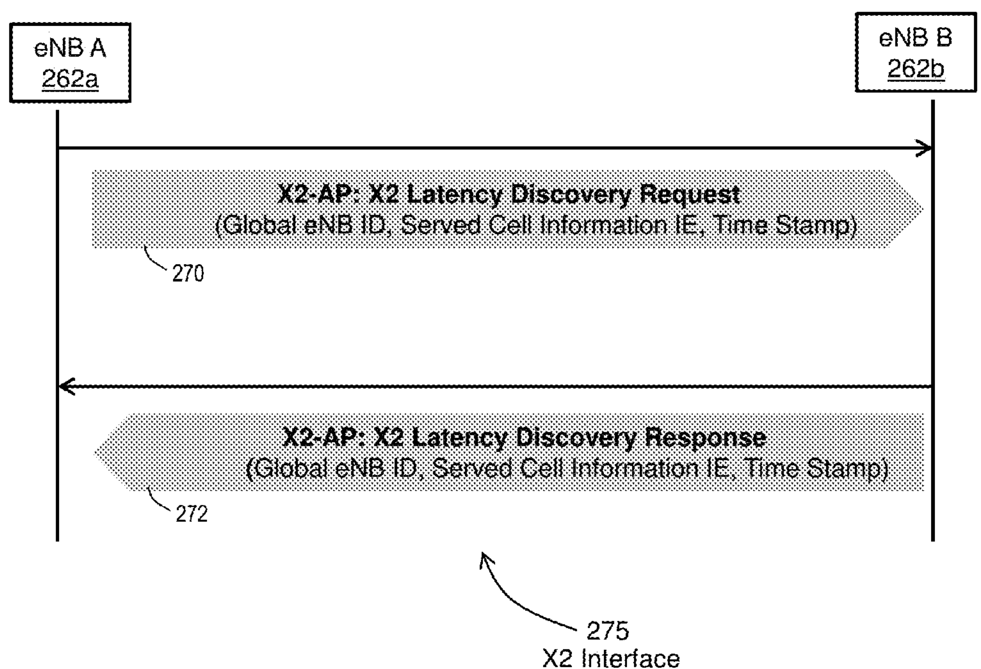
FIG. 2B depicts an illustrative embodiment of an X2 message exchange of a latency measurement.

FIG. 2B depicts an illustrative embodiment of an X2 message exchange of an inter eNB latency measurement. A first eNB A 262*a* sends a first message 270 to a second eNB B 262*b* over an X2 interface 275 between the ENBs 262*a*, 262*b*. In the illustrative example, the first message 270 is an X2 Latency Discovery Request message 270. The X2 Latency Discovery Request message 270 includes an identifier of the first eNB A 262*a*, e.g., a global eNB ID. Alternatively or in addition, the X2 Latency Discovery Request message 270 includes a served cell Information Element (IE), and a time stamp. The served cell information IE, e.g., according to 3GPP TS 36.423 section 9.2.8, includes serving cells PCI (Physical Cell Identifier), ECGI (E-UTRAN Cell Global Identifier of the neighbor cell), TAC (Tracking Area Code), etc. The time stamp can be determined and otherwise applied to the request message 270 at the time the message is generated and/or sent to the second eNB B 262*b*.

In response to receiving the X2 Latency Discovery Request message 270, the second eNB B 262*b*, generates an X2 Latency Discovery Response message 272. The X2 Latency Discovery Response message 272 includes an identifier of the second eNB B 262*b*, e.g., a global eNB ID. Alternatively or in addition, the X2 Latency Discovery Response message 272 includes a served cell Information Element (IE), and a time stamp. The served cell information IE, can include one or more of a served cell PCI, ECGI, TAC, etc. The time stamp can be determined and otherwise applied to the response message 272 at the time the message 272 is generated and/or sent to the first, requesting eNB A 262*a*. In at least some embodiments, the new X2 messages disclosed herein can be adopted or otherwise incorporated into a future X2 Access Protocol.

In some embodiments, the first node 262*a* is a primary serving node and the second node 262*b* is a secondary serving node. The primary and secondary serving nodes 262*a*, 262*b* can be arranged to provide coordinated wireless services to UE. Such services can include, without limitation, CoMP, CA and DC. Although the illustrative example includes a request from the primary serving node 262*a* to the secondary serving node 262*b*, it is understood that other messaging arrangements can be accommodated. For example, the secondary serving node 262*b* can initiate a request to the primary serving node 262*a* that includes a time stamp. The primary serving node can determine a latency by comparing the time stamp to a message receipt time to determine a latency value without necessarily requiring a response message.

Having determined a latency value between the two cells 262*a*, 262*b*, one or more eNB features can be enabled dynamically, based on the latency. For example, one or more of CoMP, CA and/or DC can be enabled based on a latency less than about 1 ms. One or more of CA and/or DC, but not CoMP can be enabled based on a latency greater than about 1 ms and less than about 5 ms. A DC, but not CoMP or CA can be enabled based on a latency greater than about 5 ms, and less than about 50 ms. Other non-real time features, e.g., load information exchange, can be enabled for any latency value, e.g., including a latency value greater than about 50 ms.

Dynamically enabling eNB features based on detected X2 latency between two cells according to the new X2 message provides a number of advantages. By way of non-limiting example, the new X2 latency request/response messages support determination of an accurate and real-time X2 latency. The X2 latency can be determined automatically, allowing an eNB feature set to be determined and/or otherwise adjusted or updated based on the X2 latency. This allows a mobile network to maximize feature benefits and improve network performance based on real-time condition.

By way of example, latency associated with an interface between macro-cells and/or small cells can be accomplished using latency discovery messages. Namely, the X2 AP (Application Protocol) can be modified to include a latency discover request message 240. A 3GPP TS 36.423, v13.3.0, entitled "Technical Specification Group Radio Access Network; Evolved Universal Terrestrial Radio Access Network (E-UTRAN); X2 application protocol (X2AP)," providing details of the X2 interface, is incorporated by reference herein in its entirety. The latency discovery request message 240 can include one or more of a cell reference, e.g., a global eNB identifier, a served cell information IE (Information Element), and a time stamp.

The X2 AP can be modified further to include a latency discovery response message 242. A latency discovery request message can be sent by one of the eNBs, such as the MeNB 202*a*, directed towards the SeNB 202*b*. The SeNB 202*b*, in reply, sends a latency discover response message 242. The message 242 can include one or more of a global eNB ID, a served cell information IE, and a time stamp. The time stamp values can be determined based on a reference time of the reference time source 253. One or both of source and target eNBs of a message exchange can calculate the X2 latency based on the timestamps.

The latency discovery messages 240, 242 can be performed once, e.g., during a system configuration. Alternatively or in addition, the latency discovery messages can be performed periodically. The periodicity can be regular, e.g., according to a measurement time interval. Alternatively or in addition, the latency discovery messages 240, 242 can be implemented according to an event. The event can include one or more of wireless traffic, back-haul/front-haul traffic, UE identity, network configuration change, time of day, day of week, and so on. In some instances the latency discovery messages 240, 242 are performed at intervals determined by other factors, such as historical records of such measurements.

If the latency is determined be a relatively stable parameter, then measurements may not need to be performed frequently. Similarly, if the latency is determined to be relatively unstable, then it the measurements can be performed more frequently. In some instances, the latency is determined each time a UE attaches to a particular eNB and/or enters a particular tracking area.

In some embodiments, the measurements of performance metrics, such as latency, are processed to determine statistics, such as averages, medians, modes, variances, and the like. In some embodiments, the latency discovery response message includes a one-way transit time. A recipient eNB/small cell can determine a one-way transit time for an X2 interface based on a time stamp in the latency discovery request received over the X2 interface and a message receipt time according to the time reference 253.

Figure 3:
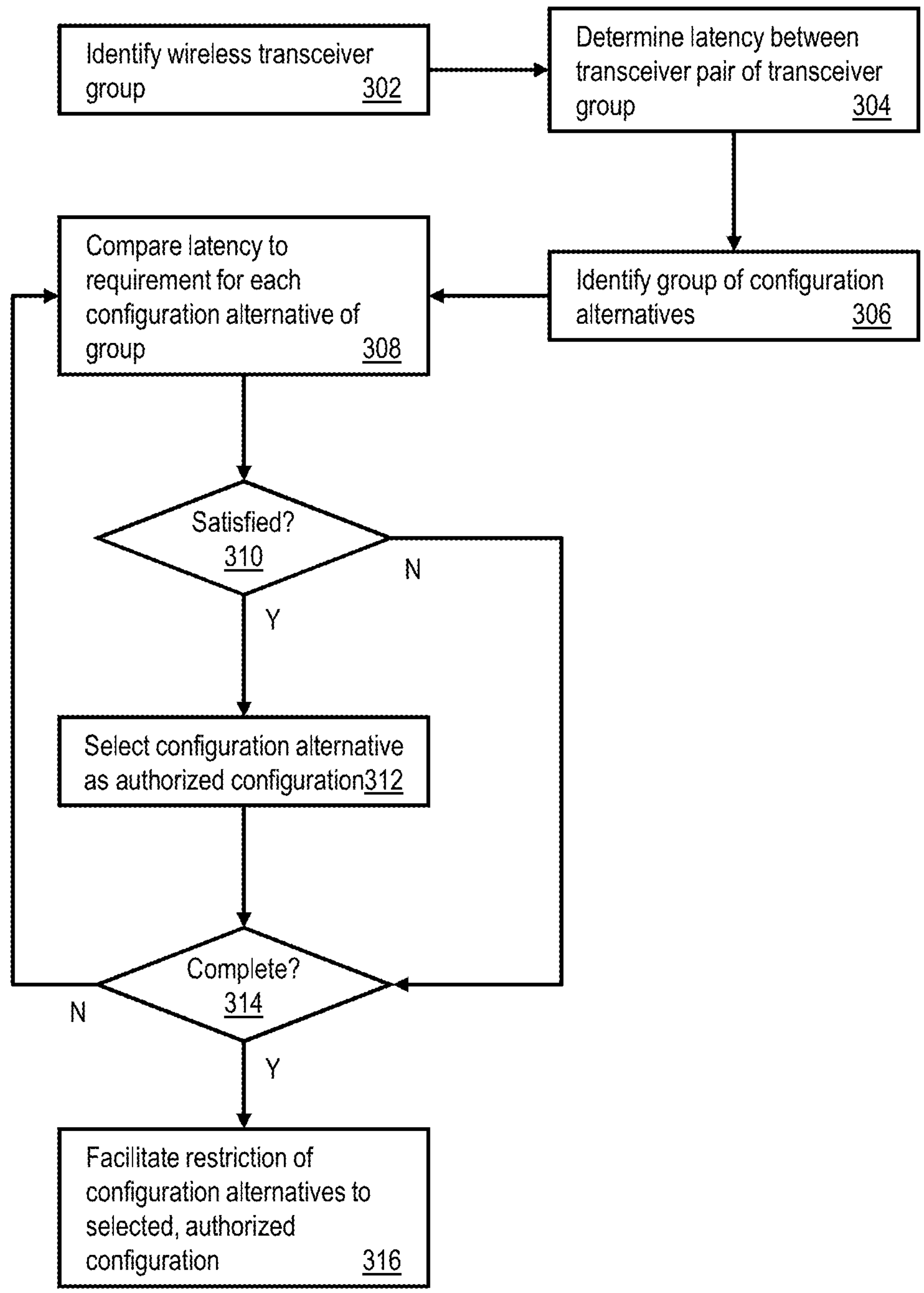
FIG. 3 depicts an illustrative embodiment of an embodiment of a process used by the systems of FIGS. 1 and 2.

FIG. 3 depicts an illustrative embodiment of an embodiment of a process 300 used by the systems of FIGS. 1 and 2. The process includes identify a wireless transceiver group at 302. This can include a pair of base stations/wireless access points, such as the MeNB 202*a* and SeNB 202*b* (FIG. 2). When more than two access points are involved, the group can include more than two access points. In some embodiments, one or more wireless transceiver groups include all possible access points, e.g., all access points having overlapping coverage, all access points having overlapping and/or adjacent coverage, and so forth. In some embodiments, the wireless transceiver group is based on a location of a particular UE and/or a service and/or data transfer requirement for a particular UE and/or particular cell. Thus, if a particular UE is a low data user, and/or a particular macro-cell and/or small cell has no high data rate users, then the corresponding access points can be excluded from the group. Conversely, if a particular UE is a high data user and/or a particular macro-cell and/or small cell has high data rate users, then the corresponding access points can be included within the group.

Latency values between transceiver pairs of transceiver group are determined at 304. The latency values can be determined according to any of the techniques disclosed herein, such as latency request/response messages. Alternatively or in addition, latency can be determined from messages of opportunity, e.g., any message exchanged over an X2 interface, and the like. In some instances, the performance parameters, e.g., latency can be measured using other equipment, such as test equipment utilized during a configuration or maintenance service of the radio access network. Such ancillary equipment can remain in place, e.g., periodically testing any of the performance parameters of one or more of the back-haul and/or front-haul links.

A group of configuration alternatives is identified at 306. Particular configuration alternatives can be identified by a network operator, e.g., based on network capabilities, software versions, and the like. This group of configuration alternatives can include all possible features, without regard to network conditions, latency values and the like. Alternatively, the group of configuration alternatives can include predetermined configuration parameters, e.g., according to a service subscription, authorization, operator preference, and the like.

The performance parameter, e.g., latency, is compared to a corresponding requirement for each configuration alternative of the identified group of configuration alternatives at 308. For example, if the configuration alternatives include CoMP, CA and DC, each having a respective latency requirement, the determined latency of the link between wireless transceivers of the group is compared to a corresponding latency requirement. Such automated determination of authorized configurations based on automatic latency measurements allow the system to be configured and reconfigured, as need be, without necessarily having to determine whether the eNBs are intra-eNBs or inter-eNBs and/or whether low-latency front-haul networks are available, as might be done for manual configurations.

A determination is made at 310 as to whether the comparison is satisfied. Satisfaction can include the latency being such that the configuration alternative can be accommodated. In response to a favorable comparison, the corresponding configuration alternative is selected or associated with the wireless transceiver pair at 312, and a determination is made at 314 as to whether comparisons are necessary for any other configuration alternatives. If so, the process continues from step 308. In response to a determination at 310 as that the comparison is not satisfied, the process continues from step 314.

Having completed the comparisons for each of the configuration alternative of the group to obtain an authorized configuration, one or more of the authorized configuration alternatives can be applied to mobile services to a UE in communication with the corresponding group of wireless transceivers. Alternatively or in addition, access to any of the non-selected or non-authorized configuration alternatives of the group can be restricted or otherwise blocked. It is understood that as link conditions change, e.g., latency of the X2 interface, a re-application of the process 300 can result in a different authorized configuration.

It is also understood that the process can be applied to individual pairs of wireless transceivers of the group of wireless transceivers. For applications involving more than two wireless transceivers, different authorized configurations can be applied according to the corresponding pair. In some embodiment involving more than two wireless transceivers, a common authorized configuration can be applied to the entire group. For example, the authorized configuration can be selected as the most restrictive, or the least restrictive. With respect to latency parameters, the authorized configuration can be based on the greatest latency among the wireless transceiver links of the group of transceivers.

In general, the process 300 can be applied to any number of coordinating wireless terminals, e.g., 2, 3 or more, and any group of configuration alternatives related to wireless services to a single UE coordinated among multiple wireless terminals. Although the illustrative examples refer to selection or authorization being based on latency, it is understood that the comparisons can be based on one or more other performance parameters, such as delay, signal strength, noise, and so on. In some embodiments, the performance parameters can include combinations of multiple parameters, such as latency and noise, etc.

The X2 latency between two LTE cells is an important factor for determining what features can be supported and whether the feature are suitable for intra-eNB and/or inter-eNB. Different features have different requirements for X2 latency. For example, CoMP requires the most stringent X2 latency, sub-millisecond, inter-eNB CA requires X2 latency less than about 5 ms, and dual connectivity has relaxed X2 latency and can use non-ideal backhaul. In terms of the performance, CoMP>inter-eNB CA>dual connectivity, presuming that each of the different features has its corresponding latency requirement met.

It is worth noting that the peer-to-peer latency discovery techniques disclosed herein can be distinguished from other latency discovery mechanisms such as TWAMP (Two Way Active Measurement Protocol), e.g., built upon a client-server (controller/responder) architecture to estimate a backhaul performance (e.g., latency, loss . . . ) between an eNB and a network server. With the peer-to-peer techniques disclosed herein, any eNB can initiate a latency request, which is distinguishable from specific client/server concept. The peer to peer latency facilitates selection of an optimal eNB feature set.

Figure 4:
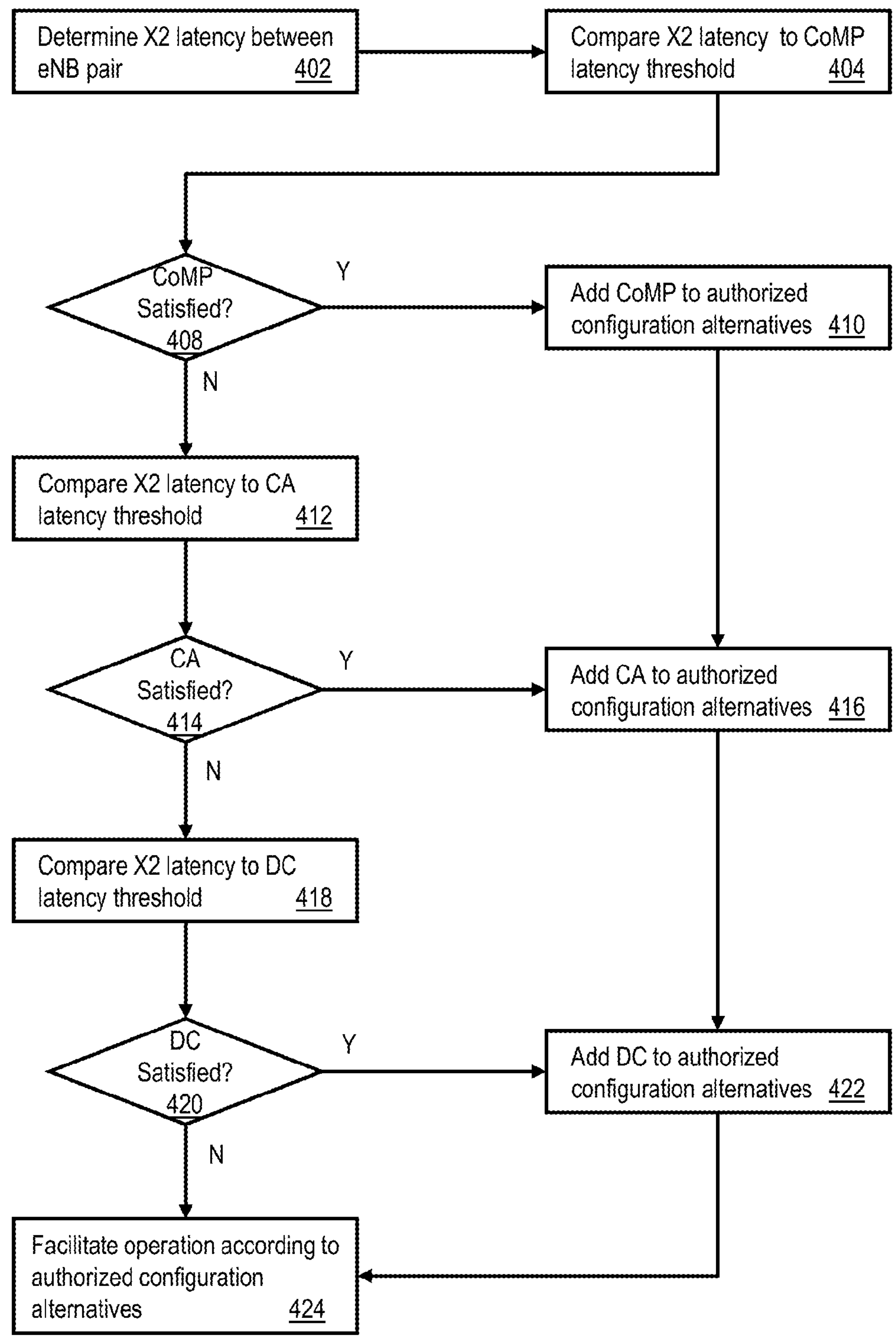
FIG. 4 depicts an illustrative embodiment of another embodiment of process used by the systems of FIGS. 1 and 2.

FIG. 4 depicts an illustrative embodiment of another embodiment of process used by the systems of FIGS. 1 and 2. Latency of an X2 interface between a pair of eNBs is determined at 402. For example, the latency can be determined for the X2 interface 252 between the MeNB 202*a* and the SeNB 202*b* (FIG. 2). The latency can include a time value, e.g., determined using one or more of the latency discovery request 240 and response 242 messages (FIG. 2).

The determined X2 latency is compared to a CoMP latency threshold at 404. In some applications, the CoMP latency threshold can be about 1 ms, such that latency measurements less than 1 ms satisfy the CoMP latency threshold. It is understood that the latency threshold can be established at other values, such as 500 microseconds, 100 microseconds, 10 microseconds, and/or 5 microseconds, with latency values below the corresponding threshold satisfying the CoMP requirement.

To the extent that the CoMP latency threshold is satisfied at 408, the CoMP feature is added to an authorized configuration at 410. The process continues with the next threshold at 412. To the extent that the CoMP latency threshold is not satisfied at 408, the process continues with the next threshold. Namely, the determined X2 latency is compared to a CoMP latency threshold at 404. In some applications, the CoMP latency threshold can be about 1 ms, such that latency measurements less than 1 ms satisfy the CoMP latency threshold. It is understood that the latency threshold can be established at other values, such as 500 microseconds, 100 microseconds, 10 microseconds, and/or 5 microseconds, with latency values below the corresponding threshold satisfying the CoMP requirement.

To the extent that the CoMP latency threshold is satisfied at 408, the CoMP feature is added to an authorized configuration. In the illustrative scenario the latency value can be divided into several categories, according to the features. Latency requirements for some of the features can be more restrictive than others. Namely, the latency requirements for CoMP are on the order of microseconds, whereas the latency requirements for inter-eNB are on the order of about 5 ms, and the latency requirements for dual connectivity are about 50 ms. By arranging the latency threshold evaluations from most restrictive, e.g., CoMP, to least restrictive, e.g., DC, it is possible to authorize features having equal or lesser restrictive latency requirements with a single test. Thus, having established that the CoMP threshold is satisfied at 408, the CoMP feature is authorized at 410, the CA feature is authorized at 416 and the DC feature is authorized at 422.

To the extent that the CoMP latency threshold is not satisfied at 408, the process continues with the next threshold. Namely, compare X2 latency to CA latency threshold at 412. In some applications, the CA latency threshold can be about 5 ms, such that latency measurements less than about 5 ms satisfy the CA latency threshold. It is understood that the latency threshold can be established at other values, such as 10 ms, 1 ms, and so on, with latency values below the corresponding threshold satisfying the CA requirement.

To the extent that the CA latency threshold is satisfied at 414, the CA feature is added to an authorized configuration at 416. Since the DC threshold is less restrictive, the process also authorizes the DC feature at 422. To the extent that the CA latency threshold is not satisfied at 414, the process continues with the next threshold. Namely, the determined X2 latency is compared to a DC latency threshold at 418. In some applications, the DC latency threshold can be about 50 ms, such that latency measurements less than about 50 ms satisfy the DC latency threshold. It is understood that the latency threshold can be established at other values, such as 100 ms, 25 ms, and so on, with latency values below the corresponding threshold satisfying the DC requirement.

To the extent that the DC latency threshold is satisfied at 420, the DC feature is added to an authorized configuration at 422. To the extent that the CA latency threshold is not satisfied at 420, the process continues to facilitate operation according to the authorized configurations at 424.

While for purposes of simplicity of explanation, the respective processes are shown and described as a series of blocks in FIGS. 3 and 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
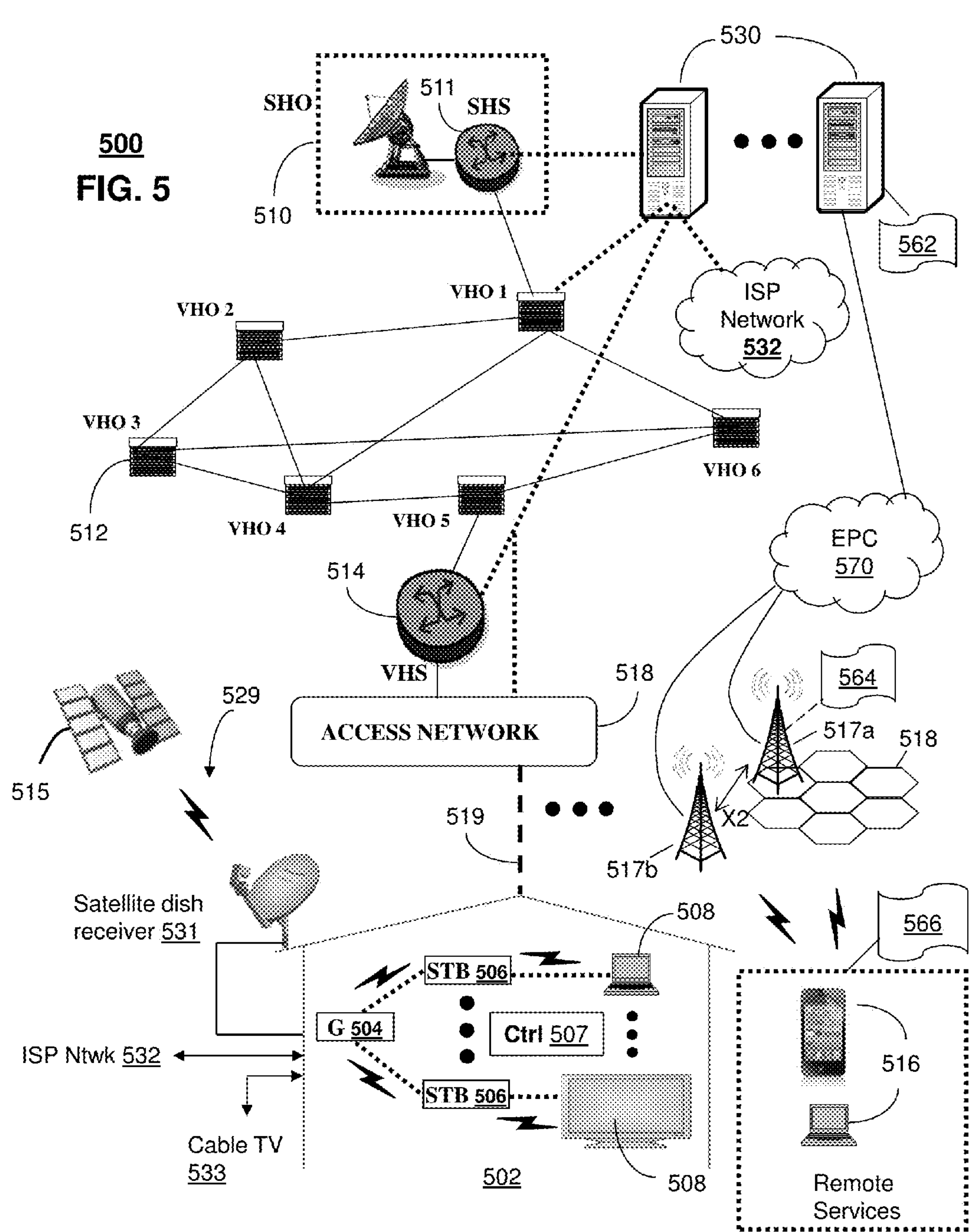
FIG. 5 depicts an illustrative embodiment of communication systems that provide media services to mobile devices using the systems of FIGS. 1 and/or 2 and according to the processes of FIGS. 3 and/or 4.

FIG. 5 depicts an illustrative embodiment of a first communication system 500 for delivering media content. The communication system 500 can represent an Internet Protocol Television (IPTV) media system. Communication system 500 can be overlaid or operably coupled with the systems 100, 200 of FIGS. 1 and/or 2 as another representative embodiment of communication system 500. For instance, one or more devices illustrated in the communication system 500 of FIG. 5 identifies a primary serving cell 517*a* and a secondary serving cell 517*b* of a mobile cellular network 518, wherein the primary serving cell 517*a* facilitates coordination of a wireless service to a mobile device 516. A latency value associated with a message exchange between the primary serving cell 517*a* and the secondary serving cell 517*b* via a messaging interface, X2, is determined. The latency value is compared to latency requirements corresponding to a group of mobile service features. A mobile service feature of the group of mobile service features is associated with the wireless service based on the comparison, wherein the service includes a coordinated exchange of wireless signals between the primary serving cell 517*a* and the mobile device 516 and between the secondary serving cell 517*b* and the mobile device 516 based on the mobile service feature of the group of mobile service features.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 and/or wireless communication devices 516. Delivery of such services to the wireless communication devices 516 can use one or more of the coordinated service features, e.g., CoMP, CA and/or DC.

Communication system 500 can also provide for all or a portion of the computing devices 530 to function as a coordinating controller (herein referred to as coordinating controller 530). The coordinating controller 530 can use computing and communication technology to perform function 562, which can include among other things, the 300, 400 techniques described by the processes of FIGS. 3 and/or 4. For instance, function 562 of the coordinating controller 530 can be similar to the functions described for the controllers 106 of FIG. 1 and/or the control module 206 of FIG. 2, in accordance with the process 300 of FIG. 3 and/or the process 400 of FIG. 4. In some embodiments, the coordinating controller is in communication with one or more of the base stations 517*a*, 517*b* and/or the wireless communications device 516, by way of a mobile network core, e.g., an EPC 570. One or more of the base stations 517*a*, 517*b*, and the wireless communication devices 516 can be provisioned with software functions 564 and 566, respectively, to utilize the services of the coordinating controller 530. For instance, functions 564 and 566 of the base stations 517*a*, 517*b*, and the wireless communication devices 516 can be similar to the functions described for the controllers 106 of FIG. 1 and/or the control module 206 of FIG. 2, in accordance with the process 300 of FIG. 3 and/or the process 400 of FIG. 4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
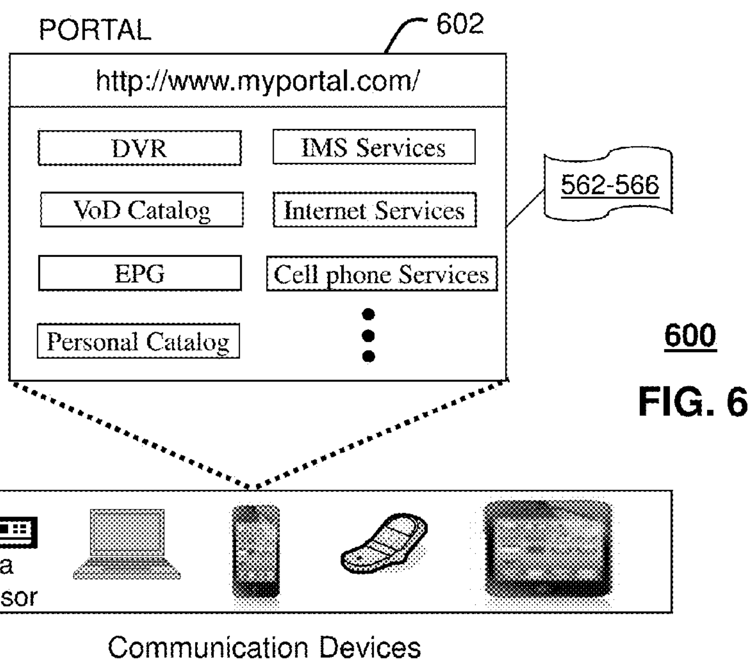
FIG. 6 depicts an illustrative embodiment of a web portal for interacting with the communication systems of FIGS. 1-2 and 5.

FIG. 6 depicts an illustrative embodiment of a web portal 602 of a communication system 600. Communication system 600 can be overlaid or operably coupled with systems 100, 200 of FIGS. 1 and/or 2, communication system 500 as another representative embodiment of systems 100, 200 of FIGS. 1 and/or 2, communication system 500. The web portal 602 can be used for managing services of systems 100, 200 of FIGS. 1 and/or 2 and communication system 500. A web page of the web portal 602 can be accessed by a Uniform Resource Locator (URL) with an Internet browser using an Internet-capable communication device such as those described in FIGS. 1 and/or 2 and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 562-566, to adapt these applications as may be desired by subscribers and/or service providers of systems 100, 200 of FIGS. 1 and/or 2, and communication system 500. For instance, users of the services provided by the coordinating controller, the base stations 517*a*, 517*b* and/or the wireless communication device 516, can log into their on-line accounts and provision the servers 110 or server 430 with parameters related to the coordinated wireless services. For example, such parameters can include, without limitation, a group of mobile features, e.g., CoMP, CA and/or DC. Alternative or in addition, such parameters can include performance parameters for links between wireless access points, such as latency, associated with each mobile feature of the group. Other features can include authorizations, user preferences, levels of subscription, and the like. Service providers can log onto an administrator account to provision, monitor and/or maintain the systems 100, 200 of FIGS. 1 and/or 2 or server 530.

Figure 7:
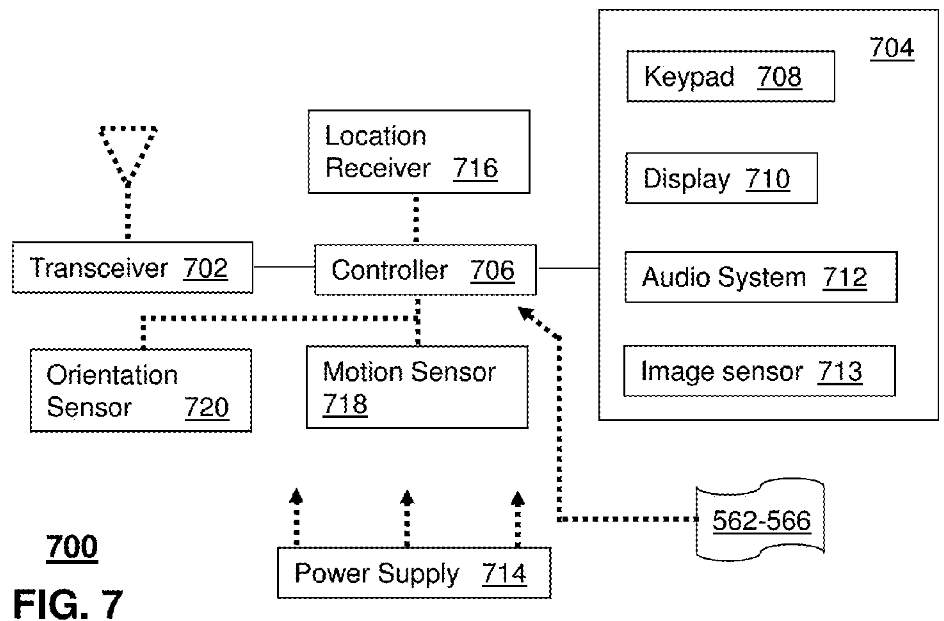
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIG. 4-5 and can be configured to perform portions of the processes 300, 300 of FIGS. 3 and/or 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices 130, 230 of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player. In addition, the controller 706 can be adapted in various embodiments to perform the functions 562-566, respectively.

Different LTE-A features have different requirements on latency between two cells. Heterogeneous network, "HetNet," deployments can include configurations with different latencies. With the rapid growth of HetNet and the transition to 5G, dynamically configuring a RAN (Radio Access Network) feature set based on performance, such as latency, between two cells can improve HetNet performance, enable operation automation, promote efficiency, and save operation cost.

Upon reviewing the aforementioned embodiments, it would be evident to an artisan with ordinary skill in the art that said embodiments can be modified, reduced, or enhanced without departing from the scope of the claims described below. For example, the techniques disclosed herein can be integrated with SON (Self Optimizing or Self Organizing Networks) to provide network automation and optimization. It is also understood that the various improvements disclosed herein support automation of network operations, save costs and support future features, e.g., 5G and/or Enable HetNet scalability. Other embodiments can be used in the subject disclosure.

SON includes automation technologies that facilitate planning, configuration, management, optimization and/or healing of mobile radio access networks. Existing SON functionality and behavior have been adopted and otherwise specified by organizations such as 3GPP and the NGMN (Next Generation Mobile Networks). It is understood that such SON functionality can be enhanced and/or extended to include one or more of mobile network configuration, mobile network optimization and or mobile network healing based on X2 latency values obtained using the new X2 latency discovery messages.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
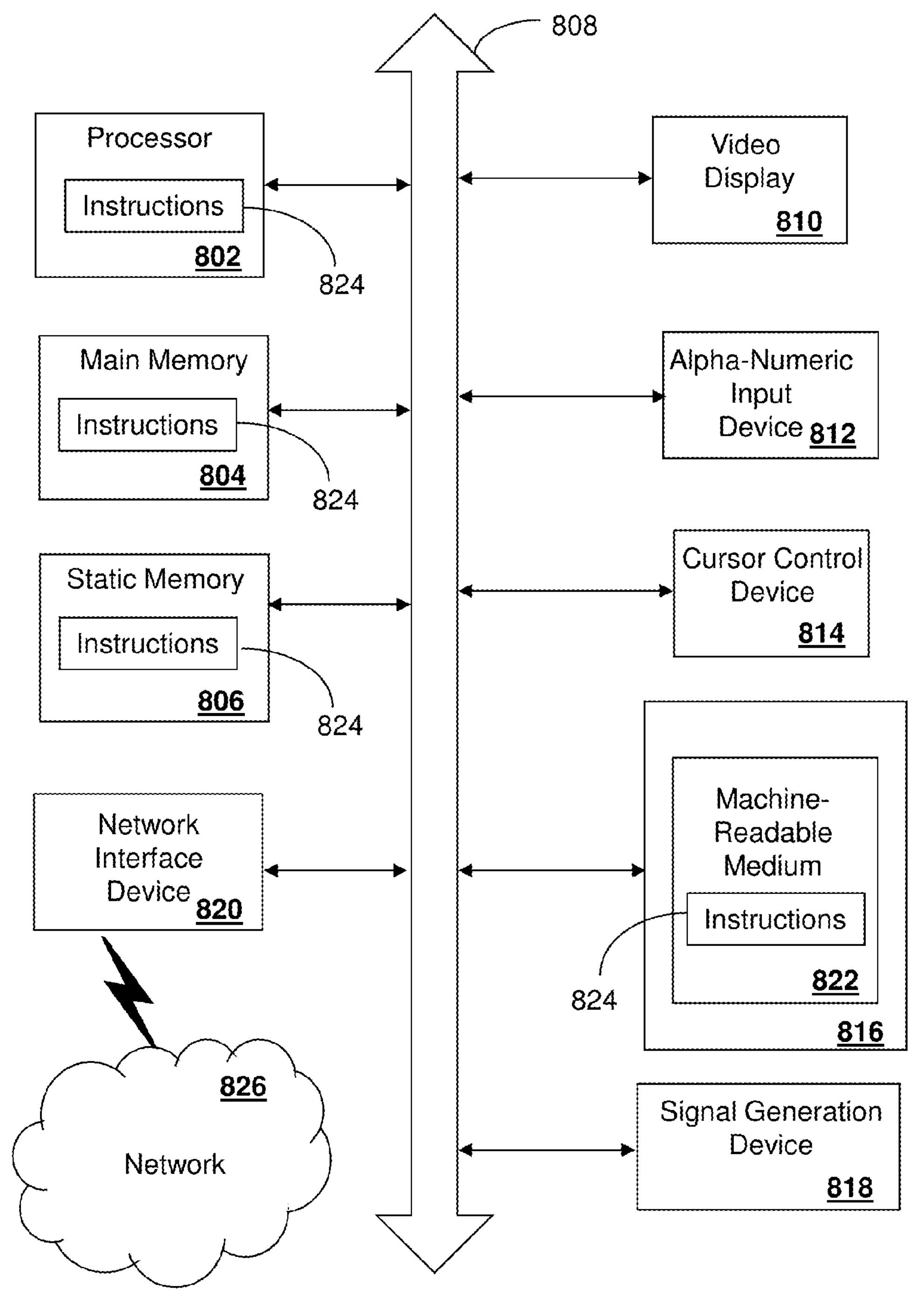
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the coordinating controller 106, 206, 530, the wireless access terminal 102, 114, 116, 118, 202, 517. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:

a processing system including a processor; and a memory that stores executable instructions that, when executed by the processing system, facilitate performance of operations, the operations comprising:

identifying a primary serving cell and a secondary serving cell of a mobile cellular network, wherein the primary serving cell facilitates one of attachment of a mobile device to the mobile cellular network, re-attachment of the mobile device to the mobile cellular network, or mobility of the mobile device between the primary serving cell and another cell of the mobile cellular network;

determining a latency value associated with a message exchange between the primary serving cell and the secondary serving cell, the message exchange occurring via a messaging interface between the primary serving cell and the secondary serving cell;

obtaining a comparison between the latency value and a plurality of latency requirements corresponding to a plurality of mobile service features; and selecting, based on the comparison, a mobile service feature of the plurality of mobile service features, wherein the mobile service feature comprises a coordinated exchange of wireless signals between the primary serving cell and the mobile device and between the secondary serving cell and the mobile device, the coordinated exchange of wireless signals being based on the mobile service feature of the plurality of mobile service features.

2. The system of claim 1, wherein the primary serving cell is associated with a first base station of the mobile cellular network, and the secondary serving cell is associated with a second base station of the mobile cellular network, wherein the messaging interface comprises an X2 interface and wherein the determining of the latency value comprises exchanging an X2 latency message between the first base station and the second base station using an X2 application protocol of the messaging interface that includes the X2 latency message.

3. The system of claim 1, wherein the operations further comprise determining a demand for the mobile service feature of the plurality of mobile service features, and wherein the selecting the mobile service feature is responsive to the demand.

4. The system of claim 1, wherein the plurality of mobile service features comprises coherent joint radio frequency transmissions from the primary serving cell and the secondary serving cell to the mobile device, an aggregation of radio frequency carriers of the primary serving cell and the secondary serving cell, or a dual connectivity between the primary serving cell, the secondary serving cell and the mobile device.

5. The system of claim 4, wherein the coherent joint radio frequency transmissions comprises $3^{rd}$ Generation Partnership Protocol, Long Term Evolution coordinated multipoint transmissions, and wherein the latency requirement comprises a latency threshold of not more than about 1 millisecond.

6. The system of claim 4, wherein the aggregation of radio frequency carriers comprises $3^{rd}$ Generation Partnership Protocol, Long Term Evolution carrier aggregation, and wherein the latency requirement comprises a latency threshold of not more than about 5 milliseconds.

7. The system of claim 4, wherein the dual connectivity comprises $3^{rd}$ Generation Partnership Protocol, Long Term Evolution coordinated multipoint transmissions, and wherein the latency requirement comprises a latency threshold of not more than about 50 milliseconds.

8. A method, comprising:

determining, by a processing system including a processor, a first cell and a second cell of a mobile cellular network, wherein the first cell facilitates coordination of a wireless service to a mobile device;

determining, by the processing system, a latency value associated with a message exchange between the first cell and the second cell, the message exchange occurring via a messaging interface between the first cell and the second cell;

obtaining, by the processing system, a comparison between the latency value and a plurality of latency requirements corresponding to a plurality of mobile features; and selecting, based on the comparison, by the processing system, a mobile feature of the plurality of mobile features, wherein the mobile feature comprises a coordinated exchange of wireless signals between the first cell and the mobile device and between the second cell and the mobile device, the coordinated exchange of wireless signals being based on the mobile feature of the plurality of mobile features.

9. The method of claim 8, wherein the first cell is associated with a first base station of the mobile cellular network, and the second cell is associated with a second base station of the mobile cellular network, and wherein the determining of the latency value comprises exchanging an X2 latency message between the first base station and the second base station using an X2 application protocol of the messaging interface adapted to include the X2 latency message.

10. The method of claim 8, further comprise determining a demand for the mobile feature of the plurality of mobile features, and wherein the selecting the mobile feature is responsive to the demand.

11. The method of claim 8, wherein the plurality of mobile features comprises coherent joint radio frequency transmissions from the first cell and the second cell to the mobile device, an aggregation of radio frequency carriers of the first cell and the second cell, or a dual connectivity between the first cell, the second cell and the mobile device.

12. The method of claim 11, wherein the coherent joint radio frequency transmissions comprises $3^{rd}$ Generation Partnership Protocol, Long Term Evolution coordinated multipoint transmissions, and wherein the latency requirement comprises a latency threshold of not more than about 1 millisecond.

13. The method of claim 11, wherein the aggregation of radio frequency carriers comprises $3^{rd}$ Generation Partnership Protocol, Long Term Evolution carrier aggregation, and wherein the latency requirement comprises a latency threshold of not more than about 5 milliseconds.

14. The method of claim 11, wherein the dual connectivity comprises $3^{rd}$ Generation Partnership Protocol, Long Term Evolution coordinated multipoint transmissions, and wherein the latency requirement comprises a latency threshold of not more than about 50 milliseconds.

15. A non-transitory machine-readable storage medium, comprising executable instructions that, when executed by a processing system including a processor, facilitate performance of operations, the operations comprising:

determining a first cell and a second cell of a mobile cellular network, wherein the first cell and the second cell provide a joint wireless service to a mobile device;

determining a latency value associated with a message exchange between the first cell and the second cell, the message exchange occurring via a messaging interface between the first cell and the second cell;

obtaining a comparison between the latency value and a plurality of latency requirements corresponding to a plurality of mobile features to obtain a comparison; and selecting, based on the comparison, a group of mobile features of the plurality of mobile features to obtain a selected group of mobile features, wherein a mobile feature of the selected group of mobile features is applied to the joint wireless service to obtain, based on the mobile feature of the selected group of mobile features, a joint exchange of wireless signals between the first cell and the mobile device and between the second cell and the mobile device.

16. The non-transitory machine-readable storage medium of claim 15, wherein the plurality of mobile features comprises coherent joint radio frequency transmissions from the first cell and the second cell to the mobile device, an aggregation of radio frequency carriers of the first cell and the second cell, or a dual connectivity between the first cell, the second cell and the mobile device.

17. The non-transitory machine-readable storage medium of claim 16, wherein the coherent joint radio frequency transmissions comprises 3rd Generation Partnership Protocol, Long Term Evolution coordinated multipoint transmissions, and wherein the latency requirement comprises a latency threshold of not more than about 1 millisecond.

18. The non-transitory machine-readable storage medium of claim 17, wherein the aggregation of radio frequency carriers comprises 3rd Generation Partnership Protocol, Long Term Evolution carrier aggregation, and wherein the latency requirement comprises a latency threshold of not more than about 5 milliseconds.

19. The non-transitory machine-readable storage medium of claim 17, wherein the dual connectivity comprises 3rd Generation Partnership Protocol, Long Term Evolution coordinated multipoint transmissions, and wherein the latency requirement comprises a latency threshold of not more than about 50 milliseconds.

20. The non-transitory machine-readable storage medium of claim 15, wherein the latency value comprises a time delay, and wherein the selected group of mobile features comprises a plurality of mobile features.

* * * * *